(12) United States Patent
Ikebe et al.

(10) Patent No.: US 6,283,285 B1
(45) Date of Patent: Sep. 4, 2001

(54) DISK STORAGE CASE AND DISK TRAY

(75) Inventors: Masaru Ikebe; Yukio Miyazaki, both of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/606,101

(22) Filed: Jun. 23, 2000

(30) Foreign Application Priority Data

Jun. 25, 1999 (JP) .................................. 11-179547

(51) Int. Cl.⁷ .................................................. B65D 85/57
(52) U.S. Cl. ....................................... 206/310; 206/308.1
(58) Field of Search .............................. 206/307, 307.1, 206/308.1, 309, 310, 493, 806

(56) References Cited

U.S. PATENT DOCUMENTS

| | | | |
|---|---|---|---|
| 4,771,890 | * 9/1988 | Hofland et al. | 206/806 |
| 4,874,085 | 10/1989 | Grobecker et al. | |
| 5,377,825 | * 1/1995 | Sykes et al. | 206/310 |
| 5,494,156 | * 2/1996 | Nies | 206/310 |
| 5,515,968 | 5/1996 | Taniyama | |
| 5,653,335 | * 8/1997 | Bauer et al. | 206/308.1 |
| 5,660,274 | * 8/1997 | Chien | 206/308.1 |
| 5,746,315 | * 5/1998 | Luckow | 206/310 |
| 5,950,822 | * 9/1999 | Cloran et al. | 206/310 |
| 6,095,327 | 8/2000 | Ikebe et al. | |

FOREIGN PATENT DOCUMENTS

| | | |
|---|---|---|
| 19626925 A1 | 1/1998 | (DE) . |
| 0 762 425 A2 | 12/1997 | (EP) . |
| 3-064279 | 6/1991 | (JP) . |
| 10-106203 | 4/1998 | (JP) . |
| WO 97/00216 | 1/1997 | (WO) . |

* cited by examiner

*Primary Examiner*—Luan K. Bui
(74) *Attorney, Agent, or Firm*—Oblon, Spivak, McClelland, Maier & Neustadt, P.C.

(57) ABSTRACT

A disk storage case comprising a main body and a cover body. The main body is for storing a disk-shaped medium therein and includes a bottom wall. The cover body is mounted on the main body in such a manner that it can be freely opened and closed. The bottom wall of the main body includes hold projections and guide projections. The hold projections are integrally formed in the center portion of the bottom wall of the main body so as to be engageable with a center hole formed in the disk-shaped medium to thereby be able to hold the disk-shaped medium. The hold projections are arranged in an annular manner. The guide projections are respectively provided between the hold projections. Further, the guide projections are integrally formed in the bottom wall of the main body and higher than the hold projections. A slit is formed and surrounding a part of a root portion of each hold projection to thereby allow the hold projection to be deformed elastically.

9 Claims, 4 Drawing Sheets

DISK STORAGE CASE AND DISK TRAY

CROSS-REFERENCE TO RELATED APPLICATIONS

The present application is based on Japanese Patent Application No. Hei. 11-179547 which is incorporated herein by reference.

BACKGROUND OF THE INVENTION

1. Field of the Invention

The present invention relates to a disk storage case for storing a disk-shaped medium therein, especially, a disk-shaped medium such as a CD (compact disk) not stored in a cartridge, and a disk tray for holding a disk-shaped medium therein.

2. Description of the Related Art

Referring to a conventional disk storage case of this type, as a first example, there is known a disk storage case which is disclosed in JP-A-10-106203. This disk storage case has a main body, a cover body, and a tray including a plurality of hold projections which can be engaged with a center hole formed in a disk-shaped medium to thereby be able to hold the disk-shaped medium, while the tray is mounted into the interior portion of the main body.

As a second example, there is known a disk storage case which is disclosed in JP-A-3-64279U. This disk storage case has a main body and a cover member, while, in the main body, there is provided a plurality of holding projections integral therewith which can be respectively engaged with a disk-shaped medium to thereby be able to hold the disk-shaped medium.

However, in either of the above-mentioned conventional disk storage cases, there are still left the following problems to be solved. That is, in the first example, although its function to hold the disk-shaped medium is excellent, there are required at least three parts, namely, the main body, cover body and tray. This means that the number of parts are rather large, which not only raises the cost of the disk storage case but also increases the whole thickness of the disk storage case.

Also, in the second example, there is not found such problem as in the first example. However, to facilitate the mounting and removal of the disk-shaped medium, the hold projections must be provided in such a manner that they can be flexed relatively easily. Here, in the first example, to increase the quantity of elastic flexure of the hold projections, there is formed a large opening in the central portion of the tray. Even in the case where a large opening is formed in the tray in this manner, no problem arises because the tray is mounted in the interior portion of the main body.

However, as in the second example, in a structure in which the holding projections are formed integral with the main body, in case where there is formed a large opening in the vicinity of the hold projections, such large opening is exposed to the surface of the main body. This is the reason why, in the second example, the hold projections do not include any opening. In order to secure a certain elastic flexure quantity without forming such opening, the hold projections cannot be formed thick so much. Therefore, the strength of the hold projections becomes insufficient, or the hold projections fall down to the center side of the main body due to change with time so that their power for holding the disk-shaped medium becomes weaker gradually.

Also, in the conventional disk storage cases, especially, in the second example, it is difficult for the disk-shaped medium to be engaged with the holding projections automatically (for example, using an automatic wrapping machine). This is because the positioning of the center of the disk-shaped medium with respect to the centers of the holding projections is difficult. Therefore, there is demanded a disk storage case which allows the disk-shaped medium to be engaged with the hold projections using an automatic wrapping machine.

SUMMARY OF THE INVENTION

The present invention aims at eliminating the drawbacks found in the above-mentioned conventional disk storage cases. Accordingly, it is an object of the invention to provide a disk storage case in with the structure of the holding projections engageable with a disk-shaped medium to hold the same is simplified. The size of an opening formed for the purpose of flexing of the holding projections can not be too large, the holding projections can have sufficient elastic flexure, and the positioning of the center of the disk-shaped medium with the centers of the holding projections can be facilitated.

In attaining the above object, according to a first aspect of the invention, there is provided a disk storage case, comprising: a main body for storing a disk-shaped medium therein; and, a cover body mounted on the main body in such a manner that it can be freely opened and closed, wherein the main body includes a bottom wall having a plurality of holding projections formed in the center portion thereof integral therewith so as to be engageable with a center hole formed in the disk-shaped medium to thereby be able to hold the disk-shaped medium center hole; in each of the holding projections, there is formed a slit so as to surround part of the root portion of the holding projection to thereby allow the holding projection to be deformed elastically; and, the plurality of holding projections are arranged in an annular manner and, between the holding projections, there are provided guide projections integral with the bottom wall in such a manner that the guide projections are formed higher than the holding projections.

According to a second aspect of the invention, there is provided a disk tray for storing a disk-shaped medium therein, wherein a disk tray main body includes a bottom wall having side walls respectively provided on the outer peripheral edge thereof, on the central portion of the bottom wall, there is provided a plurality of holding projections so as to be engageable with a center hole formed in the disk-shaped medium to thereby be able to hold the disk-shaped medium center hole, and, in each of the holding projections, there is formed a slit so as to surround part of the root portion of the holding projection to thereby allow the holding projection to be deformed elastically; and, the plurality of holding projections are arranged in an annular manner and, between the holding projections, there are provided guide projections respectively integral with the bottom wall in such a manner that the guide projections are formed higher than the holding projections.

Also, according to the third aspect of the invention, in a disk tray as set forth in the second aspect of the invention, the side walls are formed higher than the guide projections.

Further, according to the fourth aspect of the invention, in a disk tray as set forth in the second or third aspect of the invention, there is further included a hook portion which is formed integral with the bottom wall of the disk tray main body.

According to the first or second aspect of the invention, the holding projections are formed integral with the bottom wall of the disk storage case main body. Therefore, the structure of the disk storage main body can be simplified. Also, due to the slits respectively formed in their associated hold projections so as to surround a part of the root portions of their associated holding projections, the hold projections can be deformed elastically. This makes it possible to secure a certain degree of elastic deformation quantity of the holding projections without increasing the size of the opening formed for securing the flexure of the holding projections. Further, between the holding projections, there are disposed the guide projections which are formed higher than the holding projections. Because of this, when the disk-shaped medium is engaged with the holding projections, the center hole of the disk-shaped medium is firstly guided by the guide projections and, after then, the center hole of the disk-shaped medium can be engaged with the holding projections. This makes it possible to facilitate the positioning of the center hole of the disk-shaped medium with respect to the centers of the holding projections.

Also, according to the third aspect of the invention, even in case where the disk tray is put on a shelf or a table with its inner surface side thereof facing downwardly, the side walls of the disk tray main body prevent the holding projections from being contacted directly with the shelf or table, thereby being able to protect the holding projections. Further, according to the fourth aspect of the invention, provision of the hook portion can facilitate the display of the disk tray.

BRIEF DESCRIPTION OF THE DRAWINGS

FIG. 1A is a plan view of the main body, showing the inner surface side thereof and FIG. 1B is a section view taken along the line I—I shown in FIG. 1A;

FIG. 2A is a plan view of the hold projections, and FIG. 2B is a section view taken along the line II—II shown in FIG. 2A, showing a state in which a disk-shaped medium is engaged with the hold projections;

FIG. 3A is a plan view of the main body, showing the inner surface side thereof, and FIG. 3B is a section view taken along the line III—III shown in FIG. 3A;

DETAILED DESCRIPTION OF THE PREFERRED EMBODIMENTS

Figure 1A:
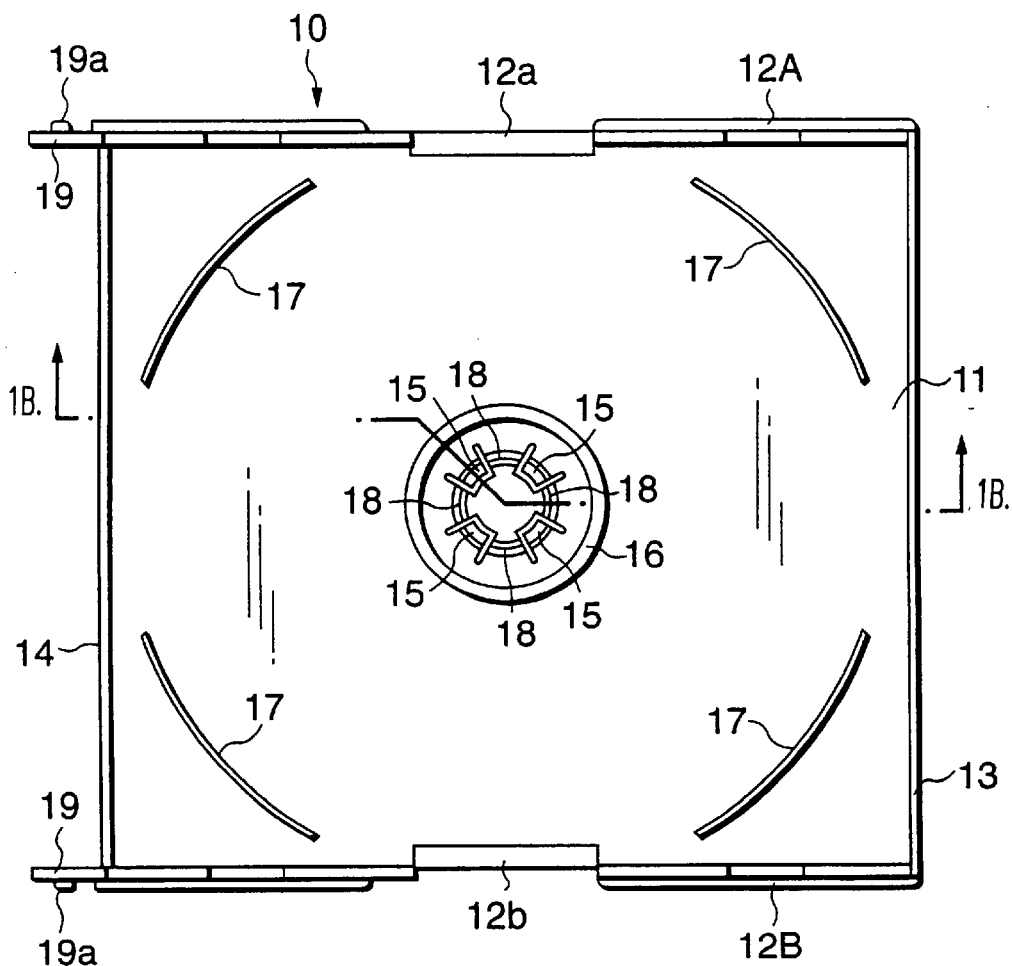
FIGS. 1A and 1B show the main body of a disk storage case according to the invention; and, in particular.
Figure 1B:
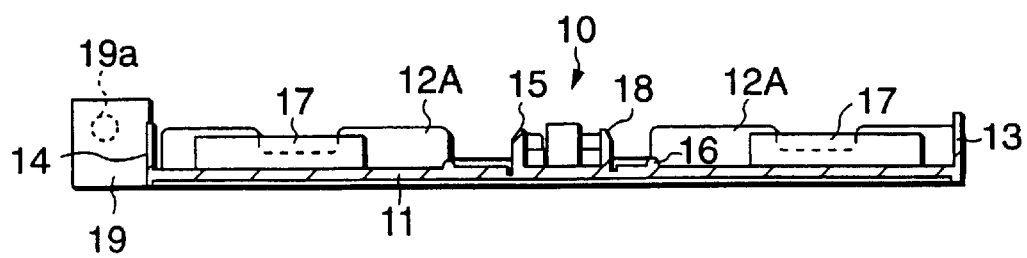

Now, a description will be given below of a first embodiment of a disk storage case according to the invention with reference to the accompanying drawings. The disk storage case according to the present embodiment includes a main body 10 and a cover body 20. Here, FIGS. 1A and 1B show the main body 10 of the disk storage case; and, in particular, FIG. 1A is a plan view of the main body, showing the inner surface side thereof, and FIG. 1B is a section view taken along the line I—I shown in FIG. 1A.

The main body 10 includes a bottom wall 11, two side walls 12 (12A and 12B) respectively provided on the outer edges of the bottom wall 11, a front surface wall 13, and a back surface wall 14. The bottom wall 11 is formed in a square shape and, in the central portion of the bottom wall 11, there are integrally formed four holding projections 15 which can be respectively engaged with a center hole formed in a disk-shaped medium (which will be discussed later) to thereby be able to holding the disk-shaped medium. Such direct provision of the hold projections 15 on the bottom wall 11 can reduce the number of parts necessary to manufacture the present disk storage case.

In the outer periphery of the holding projections 15, there is disposed a ring-shaped projection 16. This ring-shaped projection 16 is formed slightly higher than the inner surface of the bottom wall 11; and, the ring-shaped projection 16 is also structured such that, when the disk-shaped medium is held by the holding projections 15, the ring-shaped projection 16 can be contacted with the unrecorded area of the surface of the disk-shaped medium to thereby prevent the recorded area of the disk-shaped medium from touching the inner surface of the bottom wall 11 directly.

On the outer peripheral portion of the ring-shaped projection 16, there are disposed outer peripheral ribs 17. These outer peripheral ribs 17 are respectively formed in an arc shape and are disposed at four positions substantially at intervals of about 90 degrees. Also, the outer peripheral ribs 17 are structured such that, when the disk-shaped medium is held on the bottom wall 11, the ribs 17 are positioned slightly outside the outer periphery of the disk-shaped medium to thereby be able to guide the disk-shaped medium properly.

The side walls 12 consist of a pair of mutually opposing side walls 12A and 12B. In the substantially central portions of the two side walls 12, there are formed notches 12a and 12b; and, these notches 12a and 12b are used to facilitate the removal of the disk-shaped medium which is held on and by the holding projections 15 of the bottom wall 11. On the left side (in FIG. 1) of the two side walls 12A and 12B, there are disposed extension portions 19 which are respectively extended further left from the back surface wall 14. On the outer surface side of each extension portion 19, there is provided a projection-shaped support shaft 19a on which the cover body 20 can be mounted in such a manner that the cover body 20 can be opened and closed (that is, can be rotated).

Figure 2A:
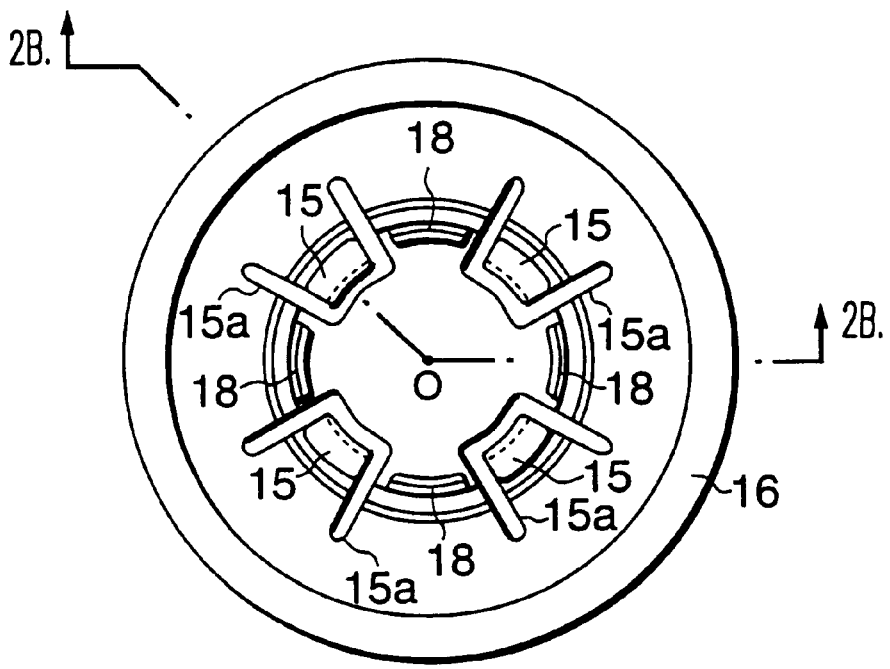
FIGS. 2A and 2B are an enlarged view of the hold projections shown in FIG. 1; in particular.
Figure 2B:
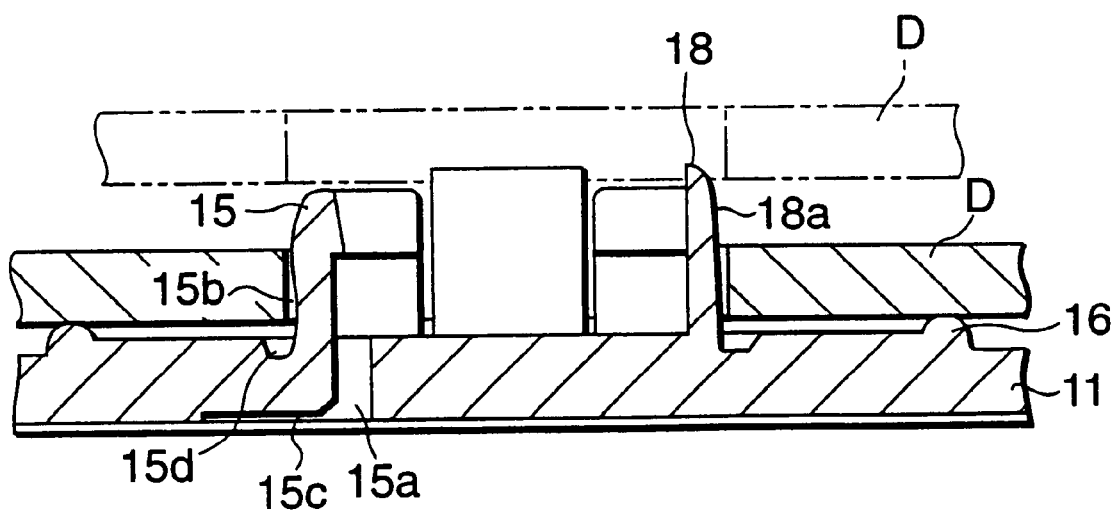

Now, FIGS. 2A and 2B show the holding projections 15 shown in FIGS. 1A and 1B, in an enlarged manner; and, in particular, FIG. 2A is a plan view of the holding projections 15, and FIG. 2B is a section view taken along the line II—II shown in FIG. 2A, showing a state thereof in which a disk-shaped medium D is engaged therewith.

The four holding projections 15 are arranged at 90 degrees intervals (at equal intervals) in an annular manner; and, each of the holding projections 15 is formed in an arc shape and includes a root portion which is connected to the bottom wall 11. In the root portion of the holding projection 15, there is formed a slit (a through groove) 15a which surrounds part of the root portion, that is, in the present embodiment, surrounds the center side and two-side-surface side of the root portion in a substantially U-shaped manner. Thus, part (a substantially trapezoidal-shaped portion) of the bottom wall 11 surrounded by the slit 15a provides a support-beam-like shape which is capable of elastic flexure, so that the holding projection 15 can be deformed elastically (that is, can be inclinedly moved to the center side).

Also, on the outer surface side of each of the holding projections 15, there is formed an undercut portion 15b which decreases in thickness toward the root portion of the holding projection 15. Due to formation of this undercut portion 15b, when the center hole of the disk-shaped medium D is engaged with the centers of the holding projections 15, the disk-shaped medium D can be held positively without any play. Further, on the outer surface side of the bottom wall 11 on the lower side of the holding projection 15, there is formed a stepped portion 15c the height of which is set a little lower than the height of the outer surface side of the bottom wall 11. The reason for formation of this stepped portion 15c is that, when the holding projection 15 is elastically deformed in its engagement with the disk-shaped medium D, the outer surface portion of the bottom wall 11 on the lower side of the holding projection 15 is prevented from projecting outwardly of the outer surface of the bottom wall 11.

Further, on the outer side of the root portion of the holding projection 15, there is formed a recessed groove 15d. Here, as described above, not only because there is formed the undercut portion 15b in the holding projection 15 but also because the holding projection 15 is elastically deformed when it is engaged with the disk-shaped medium to thereby hold the same, the root portion of the holding projection 15 requires a certain degree of strength. In order to avoid stress concentration on the root portion of the holding projection 15 when the hold projection 15 is elastically deformed, it can be expected that the outer surface side of the root portion of the holding projection 15 is formed with a groove. However, in this case, when the disk-shaped medium D is engaged with the holding projection 15, there is a fear that the lower surface peripheral edge of the center hole of the disk-shaped medium D and the groove of the root portion of the holding projection 15 can interfere with each other to thereby fail to engage the disk-shaped medium D with the hold projection 15. For this reason, by forming the recessed groove 15d on the outer side of the root portion of the holding projection 15 to thereby form the connecting portion between the bottom wall 11 and holding projection 15 with the recessed groove, not only mutual interference between the disk-shaped medium D and the root portion of the holding projection 15 but also the stress concentration on the root portion of the holding projection 15 can be prevented.

Between the holding projections 15, there are provided arc-shaped guide projections 18 in an annular manner, respectively. A distance from a center O (shown in FIG. 2A) to the outer surface of the guide projection 18 is set shorter than a distance from the center O to the outer surface of the holding projection 15. Also, the height (the upper end position) of the guide projection 18 is set higher than the height (the upper end position) of the hold projection 15. Further, on the outer surface side of the upper end portion of the guide projection 18, there is formed an inclined surface portion 18a which is inclined toward the center side of the guide projection 18. This can facilitate the guiding of the disk-shaped medium D to the hold projections 15 when the disk-shaped medium D is engaged with the holding projections 15.

In case the holding projection 15 are structured in the above manner, since an opening formed in the bottom wall 11 is only the slits 15a, the size of the opening formed in the bottom wall 11 can be made small, which can avoid a fear that the appearance of the disk storage case can be degraded. Also, the holding projections 15 can be elastically deformed with ease and also mounting and removal of the disk-shaped medium D can be facilitated. Further, the guide projections 18 can facilitate the positioning of the center hole of the disk-shaped medium D with respect to the centers of the holding projections 15, which makes it possible to engage the disk-shaped medium D with the holding projections 15 using an automatic wrapping machine.

Figure 3A:
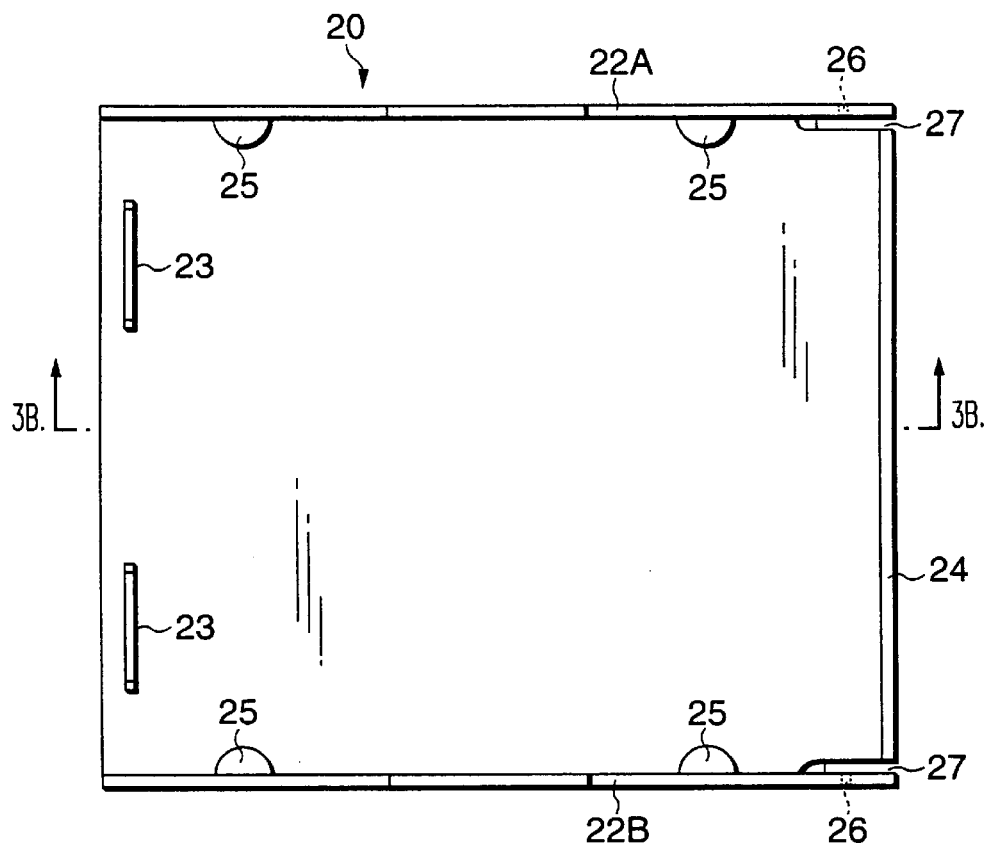
FIGS. 3A and 3B show the cover body of the disk storage case; in particular.
Figure 3B:
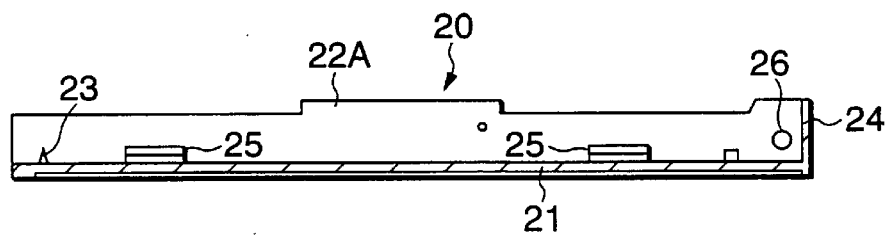

Now, FIGS. 3A and 3B show the cover body 20 of the disk storage case according to the invention. In particular, FIG. 3A is a plan view of the cover body 20, showing the inner surface side thereof, and FIG. 3B is a section view taken along the line III—III shown in FIG. 3A.

The cover body 20 is formed of transparent resin material. The cover body 20 includes a top wall 21 formed in a square shape, a pair of mutually opposing side walls 22 (22A and 22B), and a back surface wall 24 interposed between the side walls 22; but, it does not include the wall that corresponds to the front surface wall 13 disposed on the main body 10 but includes two ribs 23. These two ribs 23 can be contacted with the one end portion of an index card to thereby be able to control the movement of the index card.

The width of the top wall 21 in the horizontal direction (in FIGS. 3A and 3B) thereof is set substantially equal to the width of the main body 10 in the horizontal direction (in FIG. 1) thereof.

Also, in the respective side walls 22A and 22B, there are disposed semicircular-shaped hold pieces 25 which are used to hold the index card. The hold pieces 25 are disposed by twos in each of the side walls 22A and 22B at the given positions thereof, and are arranged substantially in parallel to the inner surface of the top wall 21 with a given clearance between them.

In the vicinity of the right (in FIGS. 3A and 3B) ends of the side walls 22, there are formed holes 26 which are used to mount the cover body 20 onto the main body 10 in a rotatable manner; and, each hole 26 is formed in such a size that the support shaft 19a of the main body 10 can be fitted into the hole 26. Also, in the portions of the top wall 21 that are located in the vicinity of the holes 26, there are formed notches 27 respectively. The notches 27 are formed so that the extension portions 19 of the main body 10 can be inserted into the notches 27.

The back surface wall 24 is interposed in an erect manner between the notches 27 formed on the inner surface side of the top wall 21. The height of the back surface wall 24 from the inner surface of the top wall 21 is set substantially equal to the height of the main body 10 (that is, the height from the outer surface side of the bottom wall 11 of the main body 10 up to the upper end of the back surface wall 14 of the main body 10).

On the inner surface side of the cover body 20, there is mounted an index card. The index card is curved in an L shape to thereby include a main surface portion and a back surface portion. The index card is mounted on the inner surface side of the cover body 20 in such a manner that the main surface portion thereof extends along the inner surface side of the top wall 21 and the back surface portion thereof extends along the inner surface side of the back surface wall 24; and, further, in such mounting of the index card, the main surface portion thereof is made to pass through a clearance between the top wall 21 and hold pieces 25.

Figure 4:
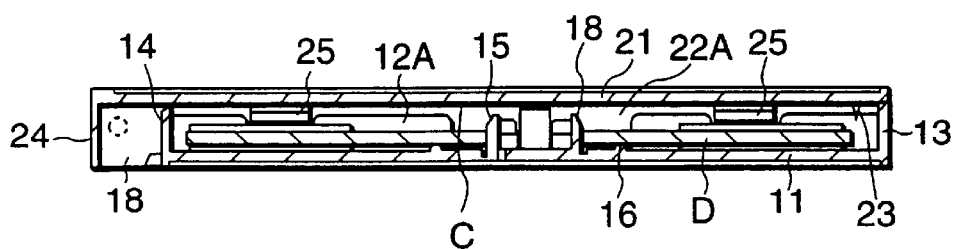
FIG. 4 is a section view taken along the I—I shown in FIG. 1A when the cover body mounted on the main body is closed, showing a state in which a disk-shaped medium and an index card are mounted into the disk storage case; and, FIG. 5 shows an embodiment of a disk tray according to the invention; and, in particular.

Now, FIG. 4 is a section view corresponding to the section view taken along the line I—I shown in FIG. 1A when the cover body 20 is mounted on the main body 10 and the cover body 20 is then closed, showing a state in which a disk-shaped medium D and an index card C are mounted therein.

In case where the support shafts 19a provided on the extension portions 19 of the main body 10 are respectively inserted into the holes 26 formed in the side walls 22 of the cover body 20, the cover body 20 can be mounted onto the main body 10 in such a manner that it can be opened and closed, that is, it can be swung with the centers of the support shafts 19a of the main body 10 as its swing fulcrum, thereby being able to produce the disk storage case according to the present embodiment of the invention.

In case where the cover body 20 is held opened, the center hole of the disk-shaped medium D is engaged with the hold projections 15 of the main body 10 to thereby hold the disk-shaped medium D on the inner surface of the bottom wall 11 of the main body 10, and the cover body 20 is then closed, there can be obtained the state that is shown in FIG. 4.

When the cover body 20 is closed, the right (in FIG. 4) end portion of the inner surface side of the top wall 21 of the cover body 20 is contacted with the upper end face of the front surface wall 13 of the main body 10. Also, at the then time, the upper end face of the back surface wall 14 of the main body 10 is allowed to approach the index card C which is mounted on the inner surface side of the top wall 21 of the cover body 20. That is, when the cover body 20 is closed, the index card C is further supported by the back surface wall 14 of the main body 10 as well.

Figure 5A:
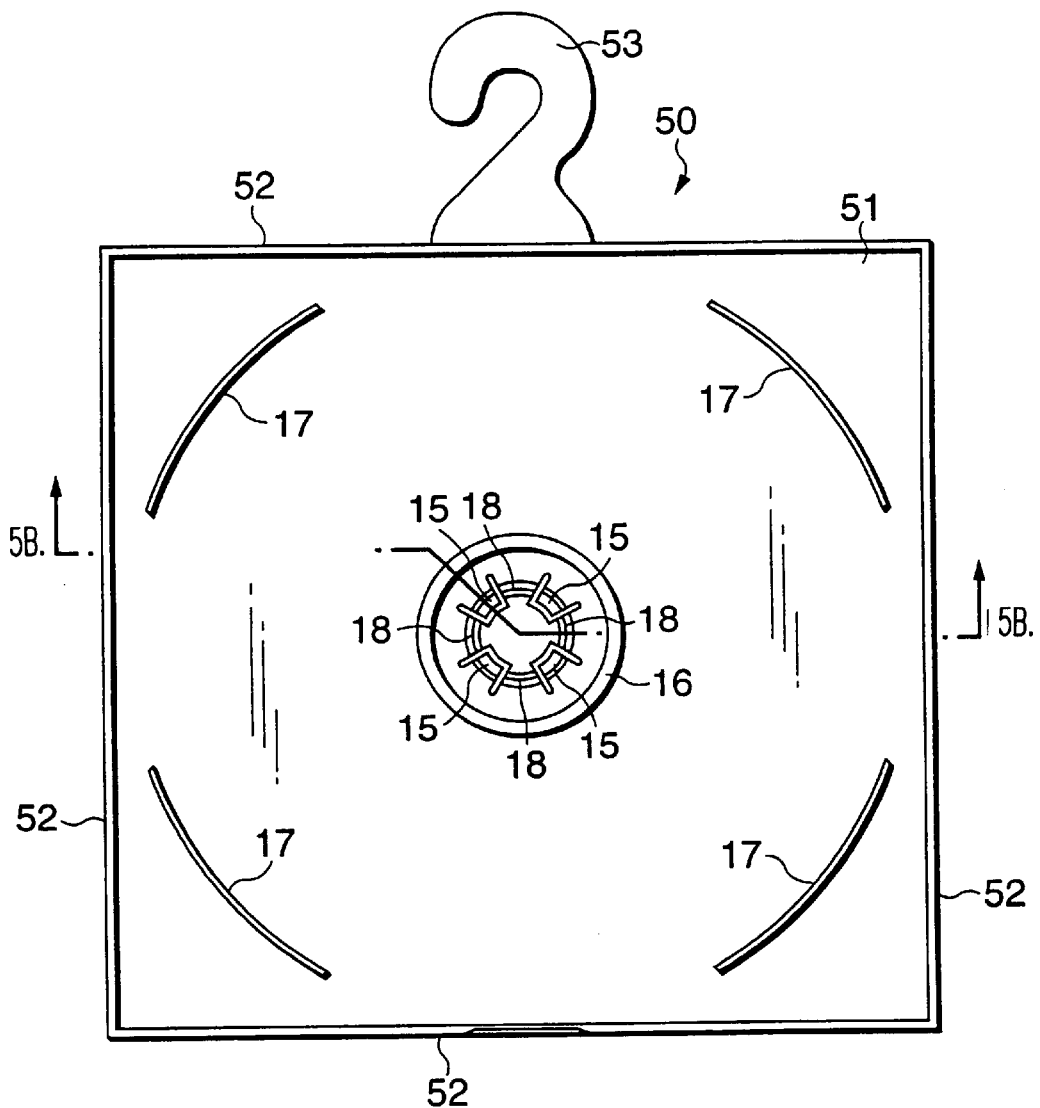
FIG. 5A is a plan view of the disk tray.
Figure 5B:
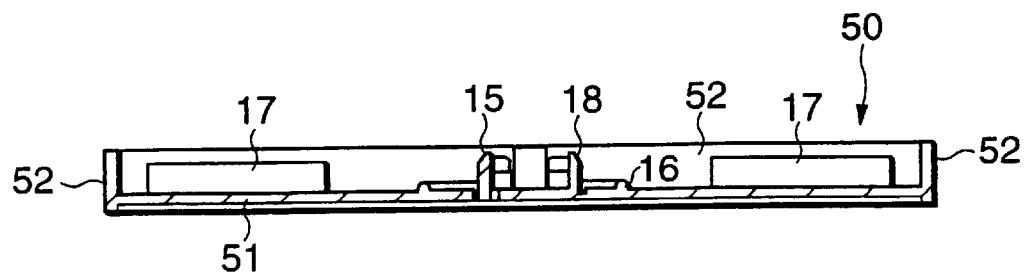
FIG. 5B is a section view taken along the line IV—IV shown in FIG. 5A.

Now, FIGS. 5A and 5B show an embodiment of a disk tray according to the invention. Specifically, FIG. 5A is a plan view of the disk tray, and FIG. 5B is a section view taken along line IV—IV shown in FIG. 5A.

The present disk tray is different from the above-mentioned disk storage case in that it does not include a member corresponding to the cover body 20 but it includes only a disk tray main body 50 corresponding to the disk storage case main body 10. In FIGS. 5A and 5B, the same parts of the present disk tray as those in the disk storage case are given the same designations.

The disk tray main body 50 comprises a bottom wall 51 and four side walls 52 respectively provided on the four side outer edges of the bottom wall 51. In the bottom wall 51, there are provided a plurality of holding projections 15, a ring-shaped projection 16 and outer peripheral ribs 17 which are all similar to those provided in the bottom wall 11 of the previously described disk storage case. Also, the guide projections 18, as described above, are formed higher than the hold projections 15, while the side wall 52 is formed higher than the guide projections 18. By employing this structure, for example, even in case where the disk tray is put on a shelf or a table with the inner surface side thereof facing downwardly, the holding projections 15 can be protected by the side walls 52.

Further, in FIG. 5A, on the upper end portion of the bottom wall 51, there is provided a hook portion 53 in such a manner that it is formed integral with the bottom wall 51 upper end portion. Due to provision of the hook portion 53, for example, when the disk-shaped medium D is held in the disk tray and is displayed in a store, the disk tray can be caught on a rod bar by means of the hook portion 53. In the thus structured disk tray as well, there can be obtained the effects of the holding projections 15 similarly to the previously described disk storage case.

Alternatively, the hook portion 53 can be omitted, whereas a plurality of disk trays can be collected and kept together in another storage case.

As has been described heretofore, according to the first or second aspect of the invention, even when the hold projections are formed integral with the bottom wall of the main body of the disk storage case, the hold projections can be elastically deformed with ease without increasing the size of the opening of the bottom wall of the main body. Also, provision of the guide projections can facilitate the positioning of the center of the disk-shaped medium with respect to the centers of the hold projections, which makes it possible to use an automatic wrapping machine.

Further, according to the third aspect of the invention, the hold projections can protected by the side walls of the main body of the disk storage case. In addition, according to the fourth aspect of the invention, provision of the hook portion can facilitate the display of the disk tray.

While only certain embodiments of the invention have been specifically described herein, it will be apparent that numerous modifications may be made thereto without departing from the spirit and scope of the invention.

What is claimed is:

1. A disk storage case comprising:
 a main body for storing a disk-shaped medium therein, said main body including a bottom wall; and
 a cover body mounted on said main body in such a manner that said cover body can be freely opened and closed,
 wherein the bottom wall of said main body includes:
  a ring-shaped projection and a plurality of outer peripheral ribs; and
  a plurality of holding projections integrally formed in a center portion of the bottom wall of said main body so as to be positionable within a center hole formed in the disk-shaped medium to thereby be able to hold the disk-shaped medium, the holding projections being arranged in an annular manner; and
  a plurality of guide projections respectively provided between the holding projections, the guide projections integrally being formed with the bottom wall of said main body so as to extend further from said bottom wall than said holding projections, and
 wherein a substantially U-shaped slit is formed surrounding a part of a root portion of each of said holding projections to thereby allow said holding projections to be deformed elastically and wherein a recessed portion is provided in a first surface of a base portion of said holding projections and a recessed portion is formed on a second surface of said bottom wall in proximity with said holding projections for making the holding projections flexible.

2. The disk tray according to claim 1, wherein a first distance from a center of a circle formed by said plurality of holding projections to an outer surface of the guide projection is less than a second distance from the center of the circle to an outer surface of the holding projections.

3. A disk tray for storing a disk-shaped medium therein, said disk tray comprising a disk tray main body including a bottom wall and side walls, said side walls being respectively provided on an outer peripheral edge of said bottom wall,
 wherein said bottom wall of said disk tray main body includes:
  a ring-shaped projection and a plurality of outer peripheral ribs; and
  a plurality of holding projections integrally formed in a center portion of the bottom wall of said main body so as to be positionable within a center hole formed in the disk shaped medium to thereby be able to hold the disk-shaped medium, said holding projections being arranged in annular manner; and
  a plurality of guide projections respectively provided between said holding projections, the guide projections integrally formed in the bottom wall of said main body and extending further from the bottom wall than the holding projections, and
 wherein a substantially U-shaped slit is formed and surrounding a part of the root portion of each hold projection to thereby allow said holding projections to be deformed elastically wherein a stepped portion is provided in a first surface of said bottom wall in proximity with a base portion of said holding projections and a recessed portion is formed on a second surface of said bottom wall in proximity with said holding projections for making said holding projections flexible.

4. The disk tray according to claim 3, wherein the side walls of said disk tray main body extend further than said guide projections.

5. The disk tray according to claim 3, further including a hook portion integrally formed in said bottom wall of said disk tray main body.

6. The disk tray according to claim 4, further including a hook portion integrally formed in said bottom wall of said disk tray main body.

7. The disk tray according to claim 3, wherein a first distance from a center of a circle formed by said plurality of holding projections to an outer surface of said guide projection is less than a second distance from the center of the circle to an outer surface of said holding projections.

8. The disk tray according to claim 4, wherein a first distance from a center of a circle formed by said plurality of holding projections to an outer surface of said guide projection is less than a second distance form the center of the circle to an outer surface of said holding projections.

9. The disk tray according to claim 5, wherein a first distance from a center of a circle formed by said plurality of holding projection to an outer surface of said guide projection is less than a second distance form the center of the circle to an outer surface of said holding projections.

* * * * *